United States Patent [19]

Toyama

[11] Patent Number: 4,496,130
[45] Date of Patent: Jan. 29, 1985

[54] SUPPORT DEVICE

[76] Inventor: Jun Toyama, 4-11, Mejiro 2-Chome, Toshima-ku, Tokyo-To, Japan

[21] Appl. No.: 433,134
[22] PCT Filed: Feb. 24, 1982
[86] PCT No.: PCT/JP82/00051
 § 371 Date: Sep. 29, 1982
 § 102(e) Date: Sep. 29, 1982
[87] PCT Pub. No.: WO82/02930
 PCT Pub. Date: Sep. 2, 1982

[30] Foreign Application Priority Data

Feb. 25, 1981 [JP] Japan .................. 56-25421

[51] Int. Cl.³ .............................. F16M 13/00
[52] U.S. Cl. ........................ 248/585; 52/167; 188/380; 248/638; 267/136
[58] Field of Search ............ 248/585, 583, 584, 580, 248/638, DIG. 1; 52/167; 188/380; 267/136

[56] References Cited

U.S. PATENT DOCUMENTS

| | | | |
|---|---|---|---|
| 2,014,643 | 9/1935 | Bakker | 52/167 X |
| 3,212,745 | 10/1965 | Lode | 248/580 |
| 3,906,689 | 9/1975 | Nakayama | 52/167 |

FOREIGN PATENT DOCUMENTS 2749654 5/1979 Fed. Rep. of Germany .
111789 12/1973 Japan .
52-76581 6/1977 Japan .
68364 6/1978 Japan .

*Primary Examiner*—J. Franklin Foss
*Assistant Examiner*—David L. Talbott
*Attorney, Agent, or Firm*—Ladas & Parry

[57] ABSTRACT

A support device for supporting a supported structure above a supporting structure, in which a ball (2) is rotatably held at the top of a first component (A) disposed on the side of either one of the supporting structure and the supported structure, and a second component (B) is so supported that this ball can be in rolling contact with a concave surface (3) of the second component, which is disposed in contact with the side of the other of supported structure and the supporting structure. On the outer side of the first component (A), a support cylinder (11) is slidably fitted, and this support cylinder (11) and the second component (B) are hinge-coupled by a parallel-linkage mechanism. The support cylinder (11) is pulled toward one of the sides by a pulling mechanism, the ball (2) and the concave surface (3) of the second component being pressed into contact, and the centripetal force acting between the ball and the concave surface is utilized to stably hold the supported structure in a normal position on the supporting structure. This support device can be used as a support device of bodies of transportation facilities and architectural structures.

10 Claims, 12 Drawing Figures

FIG. 10
FIG. 11
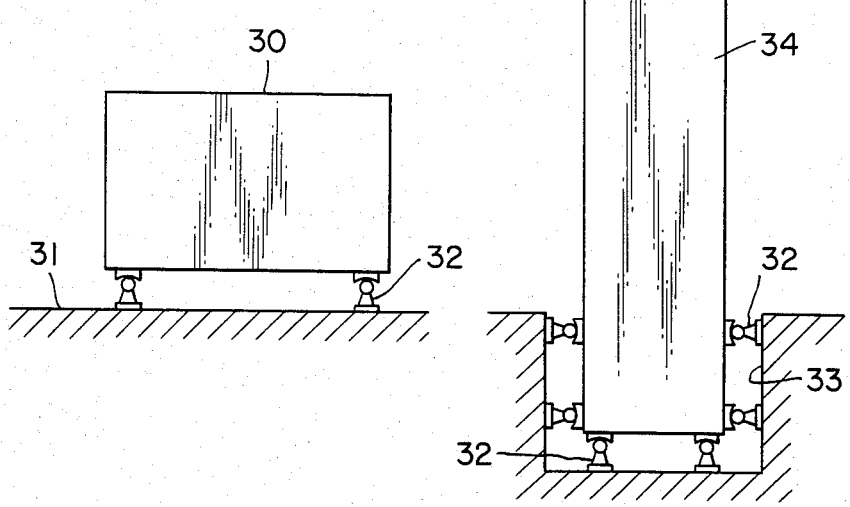
FIG. 12
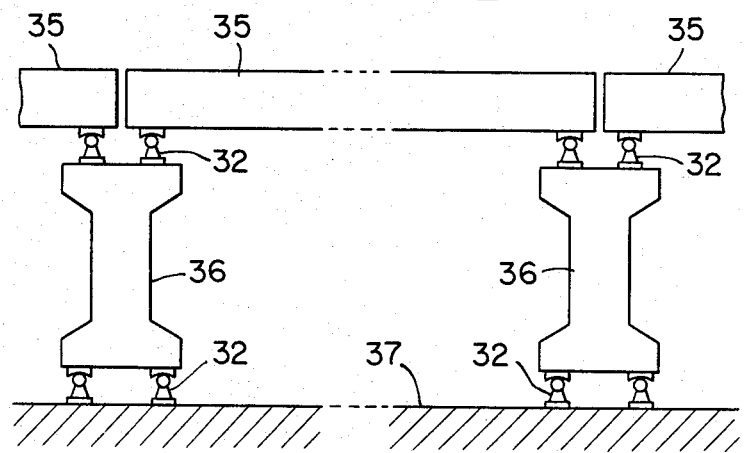

SUPPORT DEVICE

TECHNICAL FIELD

This invention relates to cushion support devices and particularly to a three-dimensional support device which is so adapted that a spherical structure is held on a first component disposed on the side of either one of a supporting structure and a supported structure, and this spherical structure is placed in rolling contact with a concave surface of a second component disposed in contact with the side of the other of the supporting structure and the supported structure, the centripetal force acting mutually between the spherical structure and the concave surface being utilized to support the supported structure on the supporting structure.

BACKGROUND ART

In the case where, in the space above a supporting structure such as a fixed structure, an object to be supported (hereinafter referred to as a supported structure) is supported, suspension or cushion support devices are used in order to prevent direct transmission of vibration from the side of the fixed structure to the supported structure.

Further, suspension or cushion support devices are used also for preventing transmission of vibration generated from the supported structure directly to the fixed structure.

As a conventional support device of this kind, one in which compression coil spring is interposed between the supported structure and the supporting structure is known. However, this device in which a compression coil spring is used effectively absorbs vibrations transmitted in the one-dimensional direction in which the spring elongates and contracts and can produce a cushioning effect but cannot amply produce a cushioning effect with respect to vibrations in directions perpendicular to that direction, and further, it also cannot readily return the supported structure to the prescribed original position in space. There are devices of the air-spring type in which an air-pressure cylinder is used in place of a compression coil spring, but similarly as in a device using a compression coil spring, it merely absorbs only vibrations transmitted in the direction in which the air spring elongates and contracts, and, with respect to movements in directions perpendicular thereto, the supported structure is placed in an unstable state.

For solving these problems, there is a device in which coil springs are assembled in three-dimensional directions in order to intercept vibrations transmitted in the three-dimensional directions. However, a device of this kind has had drawbacks such as that the places of installation of the coil springs increase, whereby the construction becomes complicated, and, furthermore, it is difficult to cause the supported structure to return to its original position and to become stabilized.

Accordingly, an object of this invention is to provide a support device adapted to isolate a supported structure from the effects of vibrations extending in three-dimensional directions thereby to support stably the supported structure in the space above a supporting structure.

Further, another object of this invention is to provide a support device so adapted that an elastically supported structure readily returns to the original position and can readily maintain stability of the attitude.

DISCLOSURE OF THE INVENTION

More specifically, this invention is one constituted by having a first component disposed on the side of either one of a supporting structure and a supported structure, a second component disposed on the side of the other and provided with a concave surface, a spherical structure held by said first component and being in rollable contact with the concave surface of the second component, an elastic support mechanism elastically supporting either one of said first component and second component on a confronting support surface, a holding mechanism of the second component held in a manner to be slidable along the outer side of said first component and hinge-coupled to said second component, and a pulling mechanism for pulling said second component in one direction so that said concave surface and spherical structure will be in pressing contact.

Furthermore, this invention is so constituted and adapted that the holding mechanism is provided with a support cylinder slidable on the outer side of the first component which support cylinder and the second component are coupled by a plurality of link bars of equal length, these link bars being coupled at both their ends by way of universal joints, whereby the second component can move parallelly while maintaining contact with the spherical structure.

By this invention constituted in this manner, vibrations in the direction perpendicular to the support surface of a supported structure supported on a supporting structure are damped by an elastic support spring. Further, even in the case where a vibration imparting force in a direction parallel to the support surface is applied to the supported structure, since the second component and the support cylinder are hinge-coupled by way of link bars, which are freely coupled, the vibration imparting force in the direction parallel to the support surface is not transmitted directly to the supported structure because of the law of inertia. Furthermore, in the case where a relative displacement develops in a direction parallel to the support surface between the first component and the second component, the spherical structure rolls on the concave surface of the second component, but at this time a centripetal force acts between the two and a force urging the supported structure to return to the original position is imparted to cause the supported structure to return to the original position, and the supported structure can be stably supported and held.

BRIEF DESCRIPTION OF THE DRAWINGS

FIGS. 10 through 12 are explanatory views indicating specific concrete examples of use of the support device according to the invention.

BEST MODE OF PRACTICING THE INVENTION

Figure 1:
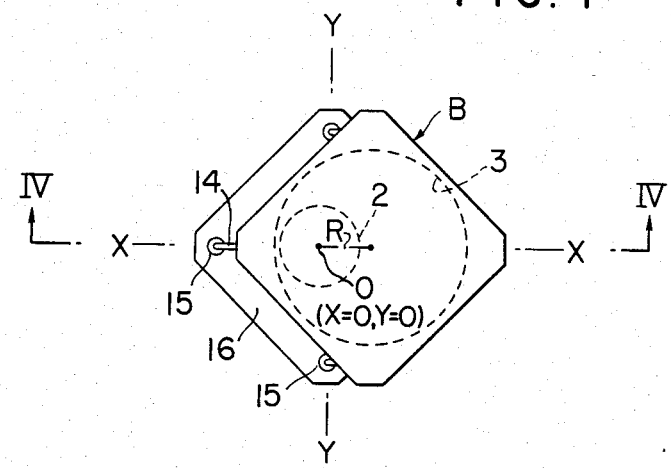
FIG. 1 is a plan view showing one example of the support device according to this invention.
Figure 2:
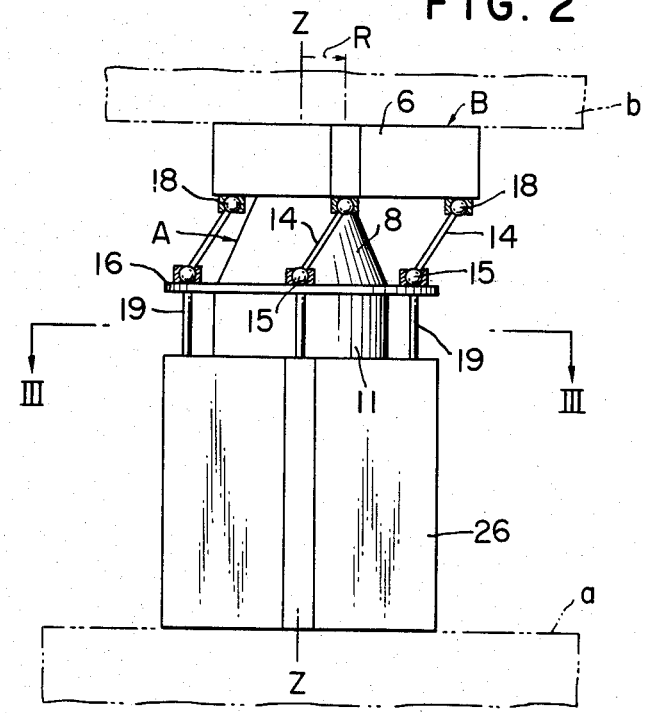
FIG. 2 is a side view of the same support device.
Figure 3:
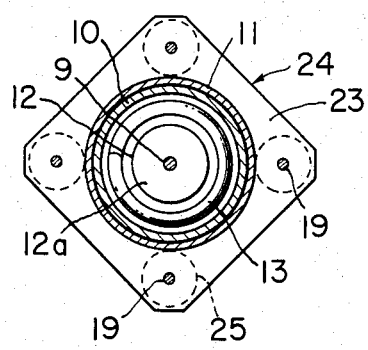
FIG. 3 is a cross section along the line III—III of FIG. 2.
Figure 4:
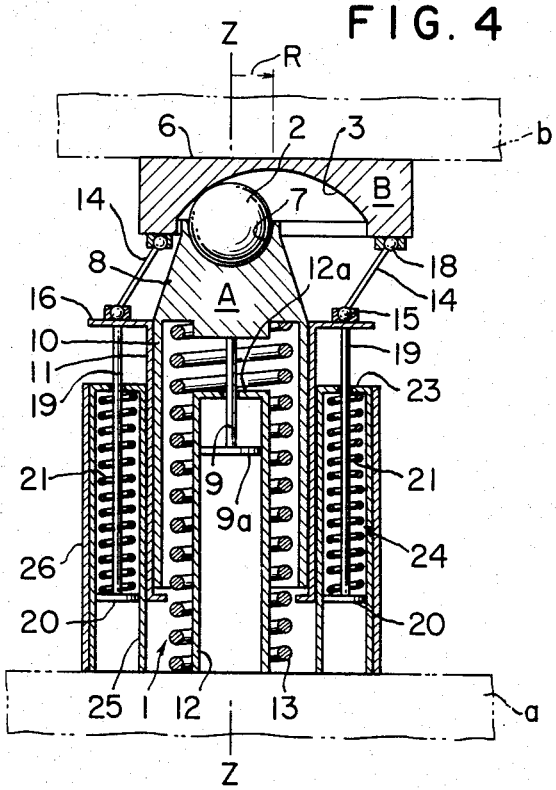
FIG. 4 is a vertical section of the support device shown as being cut along the line IV—IV of FIG. 1.

In order to describe this invention in even greater detail, it will be described below in accordance with the accompanying drawings.

As illustrated in FIGS. 1 through 4, the support device according to this invention has a ball-retaining structure A (first component), and this ball-retaining structure A is elastically supported by way of an elastic support mechanism 1 on a supporting structure a as a fixed structure. On the upper part of the above mentioned ball-retaining structure A, a seat plate B (second component) is loaded by way of a spherical structure or ball 2 which is rotatably held. In the lower surface of the above mentioned seat plate B, a concave surface 3 is formed. This concave surface 3 is formed preferably by an inner revolution paraboloidal surface which is symmetrical with respect to the central axis but is not thus limited, being satisfactory as long as it is an inner surface of revolution converging at the central axis. The above mentioned ball 2 is pushed upward by way of the ball-retaining structure A by the spring force of the spring support mechanism and is pressed against the concave surface 3, whereupon the ball 2 is subjected to a centripetal force toward the center of the concave surface 3, and the two tend to become stable at a position where the center of the ball 2 and the center of the concave surface 3 conincide.

Further, the above mentioned seat plate B is formed from a rigid material into a planar shape which is substantially a square and has at its upper part a supporting surface 6 for abutting against a supported structure b.

The above mentioned ball-retaining structure A has a ball-support head 8 provided on its upper face with a semispherical socket 7, and the ball 2 is rotatably supported in this socket 7. To the central part of the lower face of this ball-support head 8 is fixed a downwardly extending rod 9, at the lower end of which a stop flange 9a is fixed. Furthermore, around the periphery of the lower end of the ball-support head 8 is integrally fixed a hollow-cylindrical guide piston 10 of thin wall thickness. This guide piston 10 is fitted in a manner permitting it to slide in the axial direction within a support cylinder 11.

Between the above mentioned ball-support head 8 of the ball-retaining structure A and the supporting structure a, a main spring 13 of compression coil spring type is interposedly installed, and on the inner side of this main spring 13 is coaxially disposed a cylindrical member 12. This cylindrical member 12 is fixed at its lower end relative to the supporting structure a and is closed at its upper end by an upper end plate 12a, through which the aforementioned rod 9 is inserted. At the end of this rod 9, there is provided the stop flange 9a. By the abutting of this stop flange 9a against the upper end plate 12a, the ascent limiting position of the ball-retaining structure A is set.

The aforedescribed seat plate B and support cylinder 11 are hinge coupled by four support links 14 constituting a parallel-link mechanism. The lower ends of these support links 14 are coupled by way of universal joints 15 to a flange 16 of the support cylinder 11, and the upper ends of these support links 14 are similarly coupled by way of universal joints 18 to the lower face of the seat plate B. As will be apparent from FIG. 1, the connected ends of these four support links 14 are disposed at positions corresponding to the angular points (or corners) of squares, and, as a result, the seat plate B can move in all directions within a horizontal plane including the X axis and the Y axis in FIG. 1 while its supporting surface 6 is maintained horizontal.

On one hand, from the lower surface of the flange 6 of the above described support cylinder 11, four tension rods 19 respectively extend vertically, and to the axial ends of these tension rods 19 are fixed spring retainers 20. These spring retainers 20 are accommodated within fixed cylinders 24 having end walls 23, and these fixed cylinders 24 are fixed at their lower ends relative to the support surfaces of the supporting structure a and, at the same time, are disposed at four positions so as to contact the outer peripheral surface of the above described support cylinder 11. As a result, the support cylinder 11 is permitted to undergo movement only in the axial direction of the cylinder, and movement in the radial direction is restrained.

Furthermore, between the above mentioned spring retainers 20 and end walls 23, tension springs 21 are interposed and pull the tension rods 19 downward, thereby pulling the support cylinder 11 toward the supporting structure a and causing, by way of the support links 14, the seat plate B to be in pressing contact with the ball 2.

Figure 5:
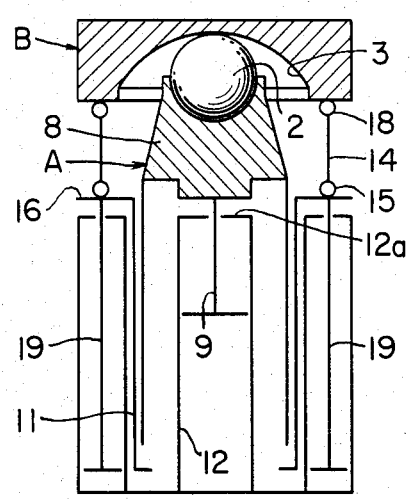
FIGS. 5 through 9 are vertical sections showing the support device under various loading conditions.
Figure 6:
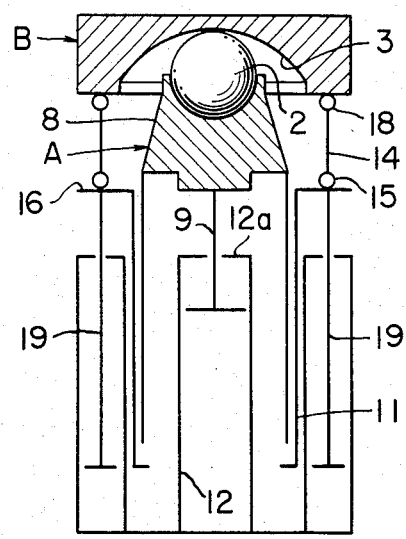
Figure 7:
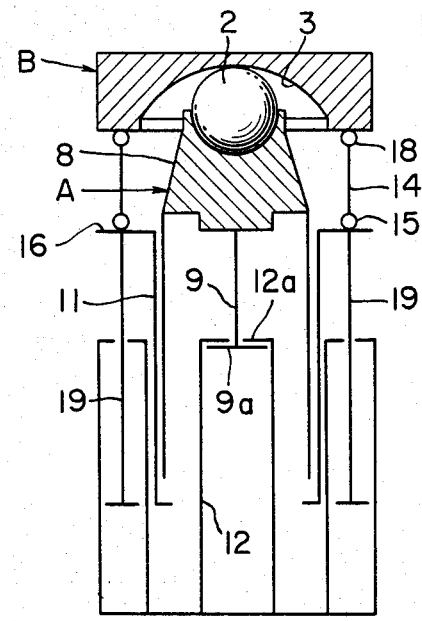

Because this invention is constituted as described above, an object b is placed as a supported structure on the seat plate B, the main spring 13 is compressed in accordance with the weight of the object, and the seat plate B descends and comes to rest at a position where the weight due to the object and the spring force of the main spring 13 balance. FIGS. 5 through 7 are comparisons of cases wherein there are no elongations and contractions of the main spring 13 in the X·Y directions and there are elongations and contractions in the Z direction, FIG. 5 indicating the state wherein the seat plate B is at its lowest position under a great load, FIG. 6 indicating the state wherein the seat plate B is at the middle under a medium load, and FIG. 7 indicating the state wherein the seat plate B is at its highest position under a small load. Also, in each of these states, since an outside force does not act in an X·Y direction between the supporting structure and the supported structure, the ball 2 is held at a position where it is in register with the center of the concave surface 3.

Figure 8:
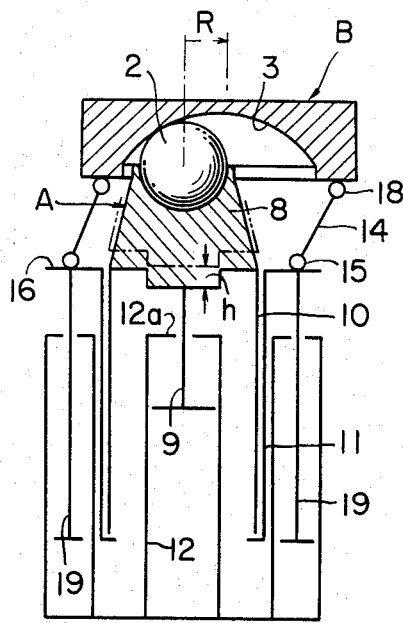
Figure 9:
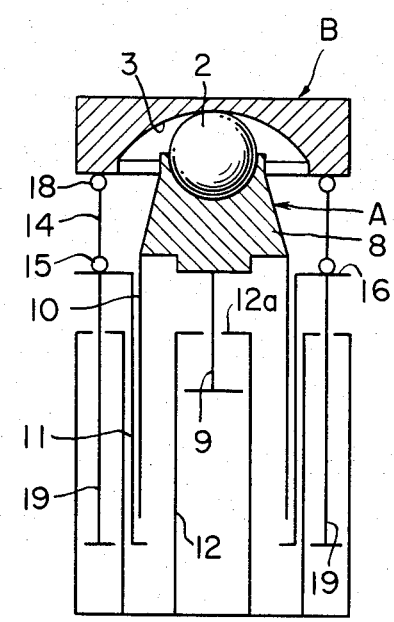

Next, a case where a vibration-applying force acts in an X·Y direction between the support structure a and the supported structure b, whereby the two structures tend to undergo displacement relative to each other will be described with reference to FIGS. 8 and 9. FIG. 8 indicates the case where the ball 2 and the center of the concave surface 3 are relatively displaced in the X direction by R, in which case the ball 2 is pushed down in the Z direction by h while it rolls along the concave surface 3 and compresses the main spring 13 by that much. Then, the ball receives the action of the spring force of the main spring 13 and presses the contact surface with the concave surface 3 perpendicularly in the arrow direction P, and the component force Px in the X direction of this pressing force acts as a centripetal force, whereby the ball 2 receives a centripetal force in the direction for registering with the center of the concave surface 3, thereby being restored to its original position as shown in FIG. 9.

In this connection, the scope of elongation and contraction of the ball 2 relative to the X·Y directions is the range of the radius $R = \sqrt{X^2 + Y^2}$ with (X=0, Y=0) of FIG. 1 as the center.

While, in the above described example, the first component (A) is elastically supported on a supporting surface by the main spring 13, this invention is not intended to be limited in this manner, and an arrangement wherein the first component (A) is integrally fixed relative to the supporting structure or the supported structure on one hand, and the main spring 13 is disposed on the second component (B) side to elastically support the second component on the support surface may be used.

Next, specific examples of use in concrete form of the support device according to this invention will be described with reference to FIGS. 10 through 12.

The example shown in FIG. 10 is an example in which an object in the shape of a rectangular parallelepiped such as a building is supported by means of four support devices 32 on the ground 31.

The example shown in FIG. 11 is an example in which a tall object 34 such as a high-rise building is supported in a pit 33 by the use of support devices 32. In this case, the support devices 32 are installed on both the bottom face and side faces of the object 34.

Further, the example shown in FIG. 12 indicates an example in which a plurality of bridge beams or girders 35 are laid on bridge piers 36, and support devices 32 are installed between the beams 35 and the piers 36 and between the piers 36 and the ground 37.

In addition to these examples of use, this invention is highly suitable also for cases wherein it is incorporated between the bogies or chassises and the bodies of railway rolling stock and motor vehicles thereby to obtain vibration proofing effect.

INDUSTRIAL APPLICABILITY

As described above, the support device according to this invention is suitable for devices for supporting a structure on a fixed installation surface while isolating the structure from vibration, for supporting bridge beams or bridge piers, and for supporting car bodies on bogies or chassises in transportation facilities.

I claim:
1. A support device constituted by having a first component disposed on the side of either one of a supporting structure and a supported structure, a second component disposed on the side of the other and provided with a concave surface, a spherical structure held by said first component and being in rollable contact with the concave surface of the second component, an elastic support mechanism elastically supporting either one of said first component and second component on a confronting support surface, a holding mechanism of the second component held in a manner to be slidable along the outer side of said first component and hinge-coupled to said second component, and a pulling mechanism for pulling said second component in one direction so that said concave surface and spherical structure will be in pressing contact.

2. A support device of claim 1 characterized in that the concave surface of said second component is a paraboloid of revolution converging with respect to the central axis.

3. A support device of claim 1 characterized in that said first component has a support head provided with a semispherical socket and a guide piston of cylindrical shape formed integrally with this support head, and said spherical structure is adapted to be held rotatably within said socket.

4. A support device of claim 1 characterized in that said elastic support mechanism comprises an elastic support spring of said coil spring type interposed between said first component and the supporting structure or a support surface of the supported structure.

5. A support device of claim 3 characterized in that a rod extends from the support head of said first component, and at the outer end of this rod a stop member is provided and is adapted to limit the ascending position of the first component.

6. A support device of claim 1 characterized in that the holding mechanism has a support cylinder fitted in a manner to be slidable in the axial direction on the outer side of the guide piston of said first component and at least three support links hinge-coupling this support cylinder and said second component.

7. A support device of claim 6 characterized in that said support links comprise four link bars of equal length disposed at equal space intervals.

8. A support device of claim 7 characterized in that both ends of the link bars of said support links are coupled by way of universal joints with respect to said second component and support cylinder.

9. A support device of claim 8 characterized in that, on the outer side of said support cylinder, a plurality of fixed cylinders are disposed so as to contact externally and permit movement only in the axial direction of the support cylinder, restraining movement in the radial direction.

10. A support device of claim 1 characterized in that said pulling mechanism comprises tension rods coupled at one end to a flange of the support cylinder and extending within said fixed cylinders and tension springs acting on these tension rods thereby to pull the second component toward the spherical structure.

* * * * *